A. R. PRIBIL.
CONNECTING ROD.
APPLICATION FILED APR. 25, 1918.

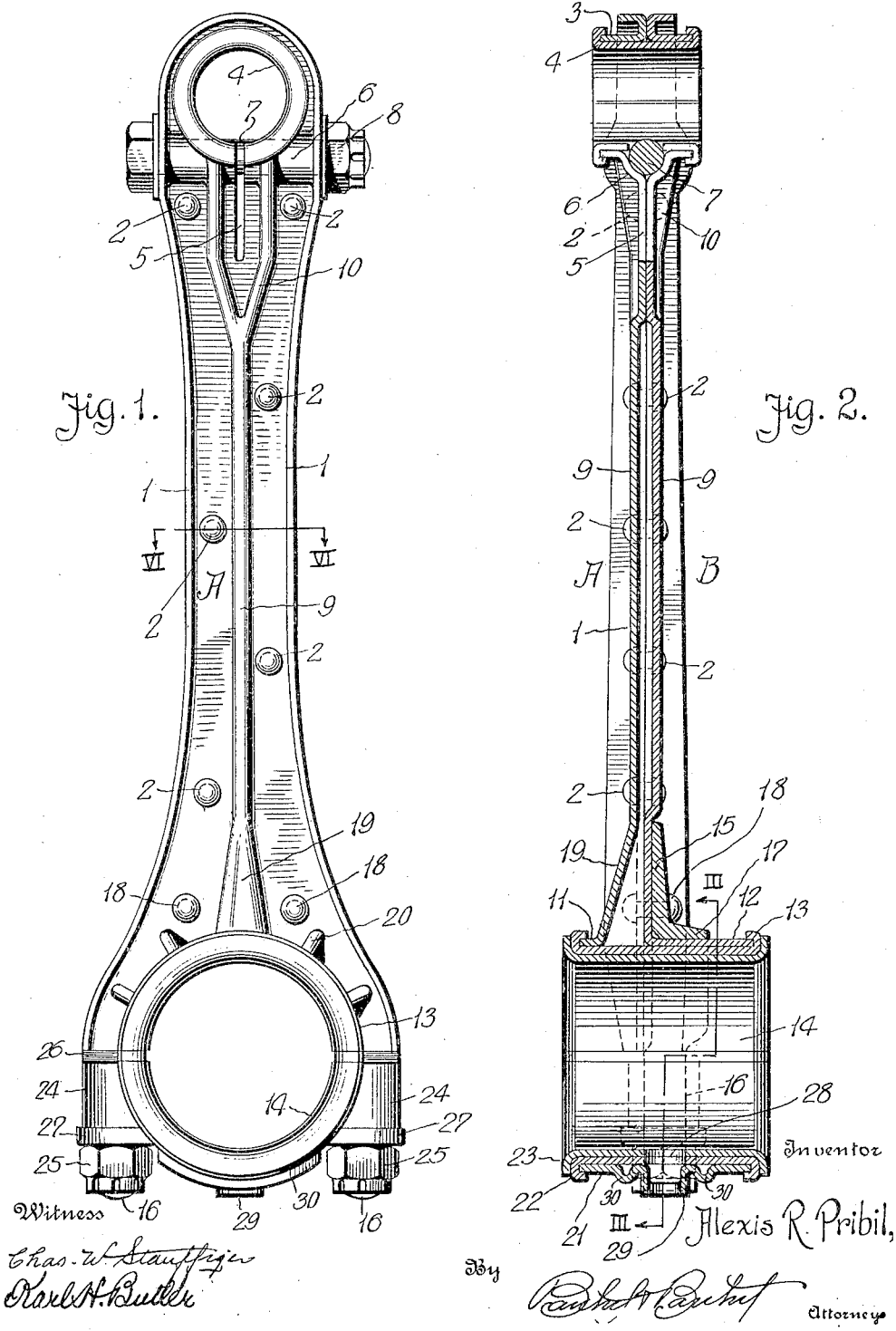

1,326,421.

Patented Dec. 30, 1919.
2 SHEETS—SHEET 2.

Witness
Chas. W. Stauffiger
Karl H. Butler

Inventor
Alexis R. Pribil,
By
Attorneys

UNITED STATES PATENT OFFICE.

ALEXIS R. PRIBIL, OF SAGINAW, MICHIGAN.

CONNECTING-ROD.

1,326,421.	Specification of Letters Patent.	Patented Dec. 30, 1919.

Application filed April 25, 1918. Serial No. 230,704.

*To all whom it may concern:*

Be it known that I, ALEXIS R. PRIBIL, a citizen of the United States of America, residing at Saginaw, in the county of Saginaw and State of Michigan, have invented certain new and useful Improvements in Connecting-Rods, of which the following is a specification, reference being had therein to the accompanying drawings.

This invention relates to connecting rods, and has special reference to what may be termed an "off-set" rod, such rod being necesssary in connection with a well known type of internal combustion engines used as the power plant of an automobile, and having crank shaft bearing portions that are slightly off-set relative to the axes of the cylinders of the engine. An engine of such design necessitates the driven end and the greater part of a connecting rod being maintained in the axis of a cylinder, and the driving end slightly off-set.

The present invention is characterized by certain improvements or refinements in connection with both ends of the connecting rod, whereby there will be less liability of the rod being cracked, fractured or otherwise injured at such point where the rod may be subjected to excessive stresses or strains, or weakened by reason of its construction or design.

The driven end of the connecting rod has a split or bifurcated bearing adapted to be contracted about a piston pin, and the material which is sprung or flexed during the contraction is reinforced by ribs emanating from the shank of the connecting rod, said ribs adding rigidity and strength to the split or bifurcated portion of the driven end of the connecting rod.

At the driving end of the connecting rod there is a more important improvement, which compensates for the off-set bearing and cap at the driving end. The improvement includes a novel U bolt which embraces the bearing and retains the cap in engagement therewith. The head or yoke portion of the bolt is designed to enter the shank of the connecting rod and be suitably connected thereto. The cross sectional area of the bolt head or yoke portion is such as to extend on to the offset portion of the bearing and thus firmly brace the bearing relative to the shank, particularly at the juncture with the bearing. In other words, the construction at the juncture at the shank and bearing of the rod maintains the same strength and rigidity as though the bearing was perfectly balanced or symmetrical relative to the shank of the connecting rod.

There are certain other refinements that will appear as my invention is better understood, and reference will now be had to the drawings, wherein—

Figure 1 is a side elevation of the connecting rod;

Fig. 2 is a longitudinal sectional view of the same;

Figure 3:
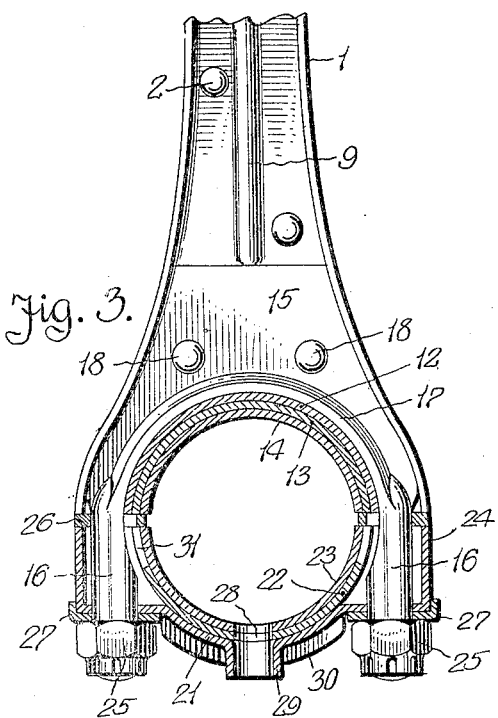
Fig. 3 is a side elevation of the driving end of the rod, showing a portion thereof in section on the line III—III of Fig. 2.
Figure 4:
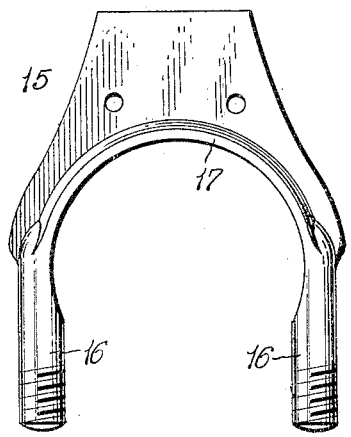
Fig. 4 is a side elevation of a detached U bolt.
Figure 5:
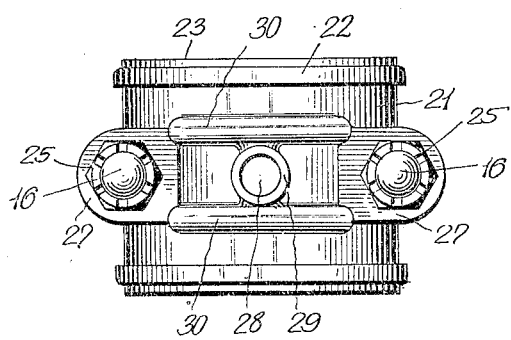
Fig. 5 is a bottom plan of the connecting rod.
Figure 6:
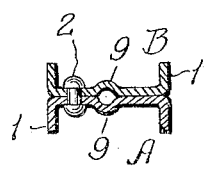
Fig. 6 is a horizontal sectional view taken on the line VI—VI of Fig. 1.

In the drawings, the reference characters A and B generally denote channel shaped pressed steel shank members disposed back to back so that the flanges 1 of the shank member A will be in a plane with the flanges 1 of the shank member B. The members A and B are connected together by rivets 2 as an instance of suitable fastening means, it being possible to spot weld or otherwise connect the shank members back to back.

The upper and lower ends of tne shank members A and B to be hereinafter referred to as the driven and driving ends, respectively, of the connecting rod, are flared or enlarged with the flanges 1 of the shank providing symmetrical lines adapted to afford the greatest degree of resistance to bending, buckling or cracking stresses to which the connecting rod may be subjected when in use.

The shank members A and B, at the upper or driven end of the rod, has pressed out alining sleeves 3 connected by a bushing 4 extending through said sleeve, and said bushing, the sleeves 3 and the webs of the members A and B are bifurcated or slotted, as at 5, so that the bushing 4 and the sleeves 3 may be contracted about a piston pin (not shown). To accomplish this the shank members A and B, contiguous to the sleeves 3, are formed with semi-cylindrical sleeves 6 providing clearance for a transverse bolt 7, said bolt having a nut 8 which when tightened is adapted to clamp the bushing 4 about the piston pin.

The shank members A and B have central longitudinal ribs 9 that are pressed out from the web portions of said channel members and these ribs have the upper ends thereof branched or forked, as at 10, to extend on to the semi-cylindrical sleeves 6, and meet the sleeves 3, as best shown in Figs. 1 and 2. The branched or forked ribs are in parallelism with the bifurcation or slit 5 and are not necessarily of less cross sectional area than the ribs 9, so that the branched or forked ends of the ribs will add strength and rigidity to the driven end of the connecting rod, thus compensating for any weakness that may have been incurred by the bifurcation or slit 5.

The shank members A and B, at the lower or driving end of the rod, terminate in semi-cylindrical sleeves 11 and 12, connected by a semi-cylindrical bushing 13 having a semi-cylindrical liner 14 of Babbitt or similar metal. The semi-cylindrical sleeve 12 of the shank member B is of greater length than the semi-cylindrical sleeve 11 of the shank member A, and the longitudinal rib 9 of the shank member B terminates at a short distance from the semi-cylindrical sleeve 12, the lower end of the rib 9 merging into the web of the shank member B, as best shown in Fig. 2, so as to provide a flat surface to receive the head or yoke portion 15 of a U bolt having screwthreaded stems 16. The head 15 of the U bolt is shaped to fit in the lower end of the shank member B with its edges abutting the inner walls of the flanges 1 of said shank member, and the head 15 has a semi-cylindrical integral flange 17 bracing the semi-cylindrical sleeve 12, thus providing a U bolt head that is angular in cross section. The head 15 is adapted to be riveted to the shank member B, as at 18, and the stems 17 of said U bolt depend from the lateral edges of the semi-cylindrical sleeves 11, 12, 13 and the liner 14 so that a cap, to be presently referred to, may be attached to the driving end of the connecting rod.

The lower end of the rib 9 of the shank member A is flared or enlarged, as at 19, so as to reinforce the shank member A at its juncture with the semi-cylindrical sleeve 11, and in addition to this flared central rib, there are auxiliary radially disposed ribs 20, as best shown in Fig. 1, which positively brace the lower web portion of the shank member A, relative to the semi-cylindrical sleeve 11.

Connected to the semi-cylindrical bearing at the lower or driving end of the connecting rod is a one piece pressed steel cap 21 having a bushing 22 and a liner 23, said cap, bushing and liner being semi-cylindrical with the cap provided with hollow bosses 24, to receive the screwthreaded stems 16 of the U bolt, so that nuts 25 may be employed for connecting the cap to the driving end of the rod.

Interposed between the cap and the driving end of the rod are gaskets or shims 26, and between the nuts 25 and the lower ends of the bosses or barrels 24 are washers 27, said washers being shaped or cupped so as to embrace the lower ends of the bosses or barrels.

The cap 21, bushing 22, and liner 23, are formed with registering openings 28 adapted to admit a lubricant to the liners 14 and 23 which are adapted to surround the crank portion of a crank shaft (not shown). The lubricant opening in the cap 21 is in the form of an out-pressed annular flange 29 and adjacent said flange are stiffening ribs 30 disposed in parallelism and extending from the lower end of one boss to the lower end of the other boss, thereby adding rigidity and strength to the lower portion of the cap.

The lateral edges of the bushing 22 are slotted or cut away, as at 31, to provide clearance for the screwthreaded stems 16 of the U bolt, thus allowing the flange 17 of the U bolt to snugly embrace the semi-cylindrical sleeve 12, and when the nuts 25 are tightened, the semi-cylindrical sleeves 11 and 12 and their parts are firmly held relative to the cap 21, and its parts, so as to provide an offset bearing at the driving end of the connecting rod.

From the foregoing, it will be observed that even though one end of the bearing at the driving end of the connecting rod is longer than the other end of the bearing, and consequently offset, that the long end of the bearing is equally as well braced, if not more, than the short end of the bearing. The connecting rod is therefore very effective for transmitting power from a piston to a crank shaft that may have crank portions out of the axis of the piston, and such transmission of power is accomplished without any danger of the connecting rod buckling, bending or cracking, particularly contiguous to the driven and driving ends of the rod.

What I claim is:—

1. A connecting rod having a bifurcated driven end, and longitudinal ribs on said rod forked to extend into parallelism with the bifurcation of said rod.

2. A connecting rod having a shank, a contractible bushing at one end thereof, said shank being bifurcated at said portion, and a rib on each side of said shank forked to extend at the sides of the shank bifurcation.

3. A connecting rod comprising a shank, having a bifurcation, a slotted bushing carried by said shank at the bifurcation thereof, said shank having sleeves at an angle to the axis of said bushing, and means in said sleeves adapted for contracting said slotted bushing, said shank having ribs lengthwise thereof and extending onto said sleeves adjacent the bifurcation of said shank.

4. A connecting rod having a shank composed of channel members disposed back to back and said members bifurcated at one end of said shank, a contractible bushing at the bifurcation of said shank, said shank having ribs in the channel members thereof forked to provide clearance for the bifurcation of said channel members.

5. A connecting rod comprising a shank having an offset bearing, a cap for said bearing, and a U bolt connecting said cap to said bearing and having a flange embracing the offset portion of said bearing.

6. A connecting rod comprising a shank having a bearing, offset relative to the axis of said shank, a cap for said bearing, and a U bolt connected to said shank and to said cap.

7. A connecting rod comprising a shank having a bearing offset relative to the axis of said shank, a cap for said bearing, and means connected to that side of said shank at the offset end of said bearing adapted for connecting said cap to said bearing.

8. A connecting rod having a shank composed of channel members disposed back to back, an offset bearing at the lower end of said shank, a cap for said bearing, and a U bolt connecting said shank and holding said cap against said bearing.

9. A connecting rod having a shank composed of channel members disposed back to back, an offset bearing at the lower end of said shank, a cap for said bearing, and means fitted in one of the members of said shank adapted for connecting said cap to said bearing.

10. The combination with a connecting rod having a shank, a bearing, and a detachable cap, of cap retaining means fitted over said bearing into said shank and attached thereto.

11. A connecting rod having a shank composed of channel members disposed back to back, an offset bearing at the lower end of said shank, ribs longitudinally of said channel members with one of said ribs flared to extend on to one end of said bearing and the other rib terminating adjacent said bearing, a cap for said bearing, and a U bolt connected to said shank adjacent the last mentioned rib and also connected to said cap.

12. The combination with a connecting rod having a shank, a bearing and a detachable cap, of a U bolt adapted for connecting said cap to said bearing, said U bolt having an angular head adapted to fit against the side of said shank and extend over said bearing.

In testimony whereof I affix my signature in the presence of two witnesses.

ALEXIS R. PRIBIL.

Witnesses:
J. D. DRAPER,
T. OCHSENKEHL.